United States Patent
Pavlin (10) Patent No.: US 11,019,378 B2
(45) Date of Patent: May 25, 2021

(54) METHODS AND APPARATUSES FOR EDITING VIDEOS FROM MULTIPLE VIDEO STREAMS

(71) Applicant: RAZER (ASIA-PACIFIC) PTE. LTD., Singapore (SG)

(72) Inventor: Ludmila Veronica Pavlin, Concord, CA (US)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 15/735,300

(22) PCT Filed: Jun. 10, 2015

(86) PCT No.: PCT/SG2015/050151
§ 371 (c)(1),
(2) Date: Dec. 11, 2017

(87) PCT Pub. No.: WO2016/200331
PCT Pub. Date: Dec. 15, 2016

(65) Prior Publication Data
US 2018/0176611 A1     Jun. 21, 2018

(51) Int. Cl.
*G06F 3/00* (2006.01)
*G06F 13/00* (2006.01)
(Continued)

(52) U.S. Cl.
CPC ....... *H04N 21/2365* (2013.01); *G11B 27/031* (2013.01); *H04N 5/222* (2013.01);
(Continued)

(58) Field of Classification Search
CPC .............. H04N 21/2365; H04N 5/222; H04N 21/234381; H04N 21/23406;
(Continued)

(56) References Cited

U.S. PATENT DOCUMENTS

| 6,762,797 | B1 * | 7/2004 | Pelletier ............... H04N 5/4448 348/559 |
| 8,187,104 | B2 | 5/2012 | Pearce |

(Continued)

FOREIGN PATENT DOCUMENTS

| CN | 101064825 A | 10/2007 |
| CN | 101981589 A | 2/2011 |

(Continued)

OTHER PUBLICATIONS

Extended European Search Report dated May 29, 2018, 8 pages, for the corresponding European Patent Application No. 15895080.8.

(Continued)

*Primary Examiner* — Kyu Chae
(74) *Attorney, Agent, or Firm* — Polsinelli PC (57) ABSTRACT

According to various embodiments, a video editor server may be provided. The video editor server may include: an input circuit configured to receive information about a plurality of input video streams; an event information receiver configured to receive event information indicating an event related to at least one input video stream of the plurality of input video streams; a selector circuit configured to select an input video stream from the plurality of input video streams based on the event information; an editing circuit configured to generate an output video stream comprising the selected video stream; and the event information; and an output circuit configured to output the output video stream.

17 Claims, 4 Drawing Sheets

(51) Int. Cl.
    *H04N 5/445*         (2011.01)
    *H04N 7/16*           (2011.01)
    *H04N 7/173*         (2011.01)
    *H04N 21/2365*     (2011.01)
    *H04N 21/854*      (2011.01)
    *H04N 21/422*      (2011.01)
    *H04N 21/658*      (2011.01)
    *H04N 21/478*      (2011.01)
    *G11B 27/031*      (2006.01)
    *H04N 5/222*       (2006.01)
    *H04N 21/234*      (2011.01)
    *H04N 21/2343*     (2011.01)

(52) U.S. Cl.
    CPC ............... *H04N 21/23406* (2013.01); *H04N 21/234381* (2013.01); *H04N 21/42201* (2013.01); *H04N 21/4781* (2013.01); *H04N 21/6582* (2013.01); *H04N 21/854* (2013.01)

(58) Field of Classification Search
    CPC ........ H04N 21/6582; H04N 21/4781; H04N 21/42201; H04N 21/854; G11B 27/031
    See application file for complete search history.

(56) References Cited

U.S. PATENT DOCUMENTS

| | | | |
|---|---|---|---|
| 8,249,153 B2 | 8/2012 | Lestage et al. | |
| 8,515,241 B2 | 8/2013 | Forsyth et al. | |
| 2002/0026644 A1* | 2/2002 | Hatayama | H04H 60/12 725/116 |
| 2004/0229685 A1* | 11/2004 | Smith | A63F 13/65 463/29 |
| 2006/0251383 A1* | 11/2006 | Vronay | G11B 27/034 386/242 |
| 2008/0279531 A1* | 11/2008 | O'Connor | G11B 27/034 386/235 |
| 2009/0087161 A1* | 4/2009 | Roberts | H04N 5/262 386/282 |
| 2011/0296478 A1* | 12/2011 | Jin | H04N 21/4316 725/109 |
| 2012/0121103 A1* | 5/2012 | Cohen | H04R 1/1083 381/77 |
| 2013/0242105 A1 | 9/2013 | Boyle et al. | |
| 2013/0281798 A1 | 10/2013 | Rau et al. | |
| 2014/0085404 A1 | 3/2014 | Kleinsteiber et al. | |
| 2014/0157307 A1* | 6/2014 | Cox | H04N 21/4331 725/34 |
| 2014/0228112 A1* | 8/2014 | Laakkonen | A63F 13/35 463/31 |
| 2014/0267749 A1 | 9/2014 | Frigon | |
| 2015/0121437 A1 | 4/2015 | Tan | |
| 2015/0332732 A1* | 11/2015 | Gilson | G11B 27/036 386/240 |
| 2016/0225410 A1* | 8/2016 | Lee | H04N 21/23424 |
| 2019/0230400 A1* | 7/2019 | Van Os | H04N 5/76 |

FOREIGN PATENT DOCUMENTS

| | | |
|---|---|---|
| CN | 101990451 A | 3/2011 |
| CN | 103988496 A | 8/2014 |
| CN | 104288992 A | 1/2015 |
| CN | 104335594 A | 2/2015 |
| CN | 103002330 A | 9/2016 |
| EP | 1242994 B1 | 11/2004 |
| EP | 2301241 B1 | 8/2014 |
| WO | WO 98/25404 | 6/1998 |

OTHER PUBLICATIONS

Office Action (including English Translation) dated Nov. 5, 2019, for the corresponding Chinese Application No. 201580082105.9 in 27 total pages.
Office Action dated Jun. 29, 2020, 5 pages, for the corresponding European Patent Application No. 15895080.8.

\* cited by examiner

METHODS AND APPARATUSES FOR EDITING VIDEOS FROM MULTIPLE VIDEO STREAMS

TECHNICAL FIELD

Various embodiments generally relate to video editor servers, video editing methods, client devices, and methods for controlling a client device.

BACKGROUND

Editing videos from a plurality of video streams may be a cumbersome task. Thus, there may be a need for an efficient video editing method. Multi-player online video game streaming is gaining widespread popularity and gamers have been streaming their accomplishments and exploits on live streaming video game platforms or social media websites. Broadcasts of e-sports competitions and other gaming-related events can also be viewed live or viewed on an on-demand basis on these video game platforms. However, these live broadcasts or streaming of video gaming content generally focus only on the gaming content of individual players. For live broadcasting of multiplayer gaming related events, significant costs are required for the outlay of professional equipment and for professional editing of streaming content. Streaming videos from multiple sources or multiple video feeds requires editing and post-production. The costs involved for equipment, hardware, and software and significant time in post-production are restrictive and challenging for individual users from sharing complex streams. For example, U.S. Pat. No. 8,187,104 discloses systems and methods that partially automate generation of video clips chronicling a character's integration with a video game. It can also combine automatic video clip generation with automatic or user-generated and/or user edited or created narrative. Multiple video clips may be combined into a video reel prior to or subsequent to uploading the same to a file-sharing site. However, the video is not live and requires post-processing time. There is also significant time and monetary cost in post-production and editing of multiple feeds from various external sources.

SUMMARY OF THE INVENTION

According to various embodiments, a video editor server may be provided. The video editor server may include: an input circuit configured to receive information about a plurality of input video streams; an event information receiver configured to receive event information indicating an event related to at least one input video stream of the plurality of input video streams; a selector circuit configured to select an input video stream from the plurality of input video streams based on the event information; an editing circuit configured to generate an output video stream comprising the selected video stream; and an output circuit configured to output the output video stream.

According to various embodiments, a video editing method may be provided. The video editing method may include: receiving information about a plurality of input video streams; receiving event information indicating an event related to at least one input video stream of the plurality of input video streams; selecting an input video stream from the plurality of input video streams based on the event information; generating an output video stream comprising the selected video stream; and outputting the output video stream.

According to various embodiments, a client device may be provided. The client device may include: an event information determination circuit configured to determine event information indicating an event related to an input video stream; and an event information transmitter configured to transmit the determined event information to a video editor server for determination whether the input video stream is to be selected for an output video stream.

According to various embodiments, a method for controlling a client device may be provided. The method may include: determining event information indicating an event related to an input video stream; and transmitting the determined event information to a video editor server for determination whether the input video stream is to be selected for an output video stream.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In this context, the video editor server as described in this description may include a memory which is for example used in the processing carried out in the video editor server. In this context, the client device as described in this description may include a memory which is for example used in the processing carried out in the client device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The reference to any prior art in this specification is not, and should not be taken as an acknowledgement or any form of suggestion that the referenced prior art forms part of the common general knowledge in Australia (or any other country).

In order that the invention may be readily understood and put into practical effect, particular embodiments will now be described by way of examples and not limitations, and with reference to the figures.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

The term "coupled" (or "connected") herein may be understood as electrically coupled or as mechanically coupled, for example attached or fixed or attached, or just in contact without any fixation, and it will be understood that both direct coupling or indirect coupling (in other words: coupling without direct contact) may be provided.

Editing videos from a plurality of video streams may be a cumbersome task. Streaming video from multiple devices and cameras to a single video feed may require editing and post production. Cost, hardware/software access, and time restrictions may keep many users from sharing complex streams.

According to various embodiments, devices and methods for efficient video editing may be provided.

According to various embodiments, an automated system may be provided that may react to key events to simultaneously encode, edit and stream multiple video feeds to a single video stream.

According to various embodiments, devices and methods may be provided for automated editing of live video streams.

According to various embodiments, devices and methods may be provided for automated editing for multi-player online video game streaming with reaction cams.

Figure 1:
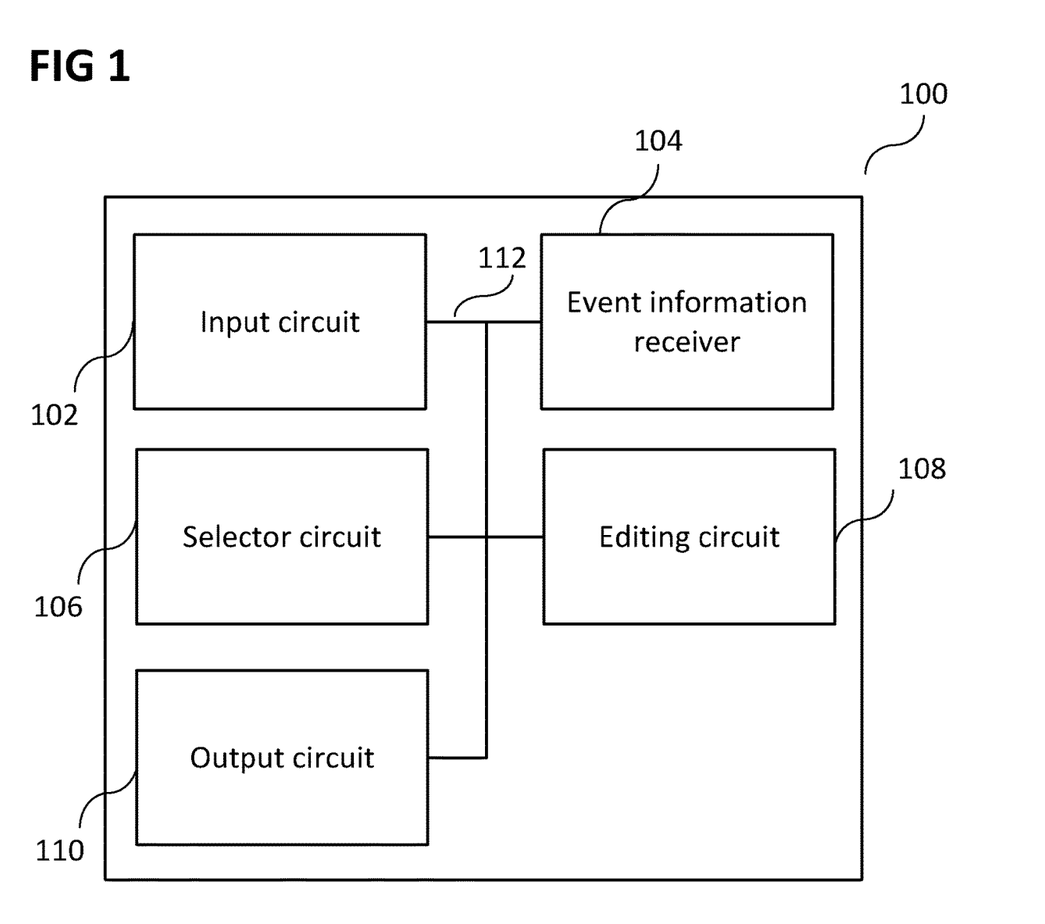
FIG. 1 shows a video editor server according to various embodiments.

FIG. 1 shows a video editor server 100 according to various embodiments. The video editor server 100 may include an input circuit configured to receive (for example from a client device, for example a client device like will be described with reference to FIG. 4 or FIG. 5 below) information about a plurality of input video streams. The video editor server 100 may further include an event information receiver 104 configured to receive (for example from the client device) event information indicating an event related to at least one input video stream of the plurality of input video streams. The video editor server 100 may further include a selector circuit 106 configured to select an input video stream from the plurality of input video streams based on the event information. The video editor server 100 may further include an editing circuit 108 configured to generate an output video stream including (or being) the selected video stream. The video editor server 100 may further include an output circuit 110 configured to output the output video stream. The input circuit 102, the event information determination circuit 104, the selector circuit 106, the editing circuit 108, and the output circuit 110 may be coupled with each other, like indicated by lines 112, for example electrically coupled, for example using a line or a cable, and/or mechanically coupled.

According to various embodiments, a video editor system may include a combination of the video editor server and one or more clients. The video editor server may be in the form of a central server that users are connected to via the network. The video editor server may include a storage/memory to store data. The client may include an application that resides in the client (which may be a processor-based electronic device). The client may for example be a desktop computer, a workstation, laptop computer, netbook, a mobile computing device, or a smartphone.

In other words, a video editor server according to various embodiments may select an output video stream based on a plurality of input video streams and based on circumstances, under which the input video streams have been generated, or based on what the input video streams show.

According to various embodiments, the information about the plurality of input video streams may include or may be the plurality of input video streams.

According to various embodiments, the information about the plurality of input video streams may include or may be information indicating for each input video stream of the plurality of input video streams that the respective input video stream is available.

According to various embodiments, the selector circuit 106 may further be configured to request (for example from the client device) the selected input video stream.

According to various embodiments, the plurality of input video streams may include a video stream showing a person playing a computer game.

According to various embodiments, the event information may include or may be or may be included in information related to the person playing the computer game.

According to various embodiments, the event information may include or may be biometric measurements or readings taken from external biometric sensors located in wearable devices. The biometric measurements or readings are taken in real time and are related to the person playing the computer game.

According to various embodiments, the event information may include or may be biometric measurements or readings relating to the person playing the game that are transferred to a client (for example a mobile computing device) in real time.

According to various embodiments, the event information may include or may be or may be included in heart rate information of the person playing the computer game.

According to various embodiments, the event information may include or may be or may be included in stress information of the person playing the computer game.

According to various embodiments, the event information may include or may be or may be included in information related to words spoken by the person playing the computer game.

According to various embodiments, the plurality of input video streams may include a video stream showing a computer game.

According to various embodiments, the event information may include or may be or may be included in information related to the computer game.

According to various embodiments, the event information may include or may be or may be included in information related to a score in the computer game.

According to various embodiments, the event information may include or may be or may be included in information related to a change of a score in the computer game.

According to various embodiments, the event information may include or may be or may be included in information issued by the computer game based on a pre-determined criteria, wherein the criteria is defined by a game maker of the game.

Figure 2:
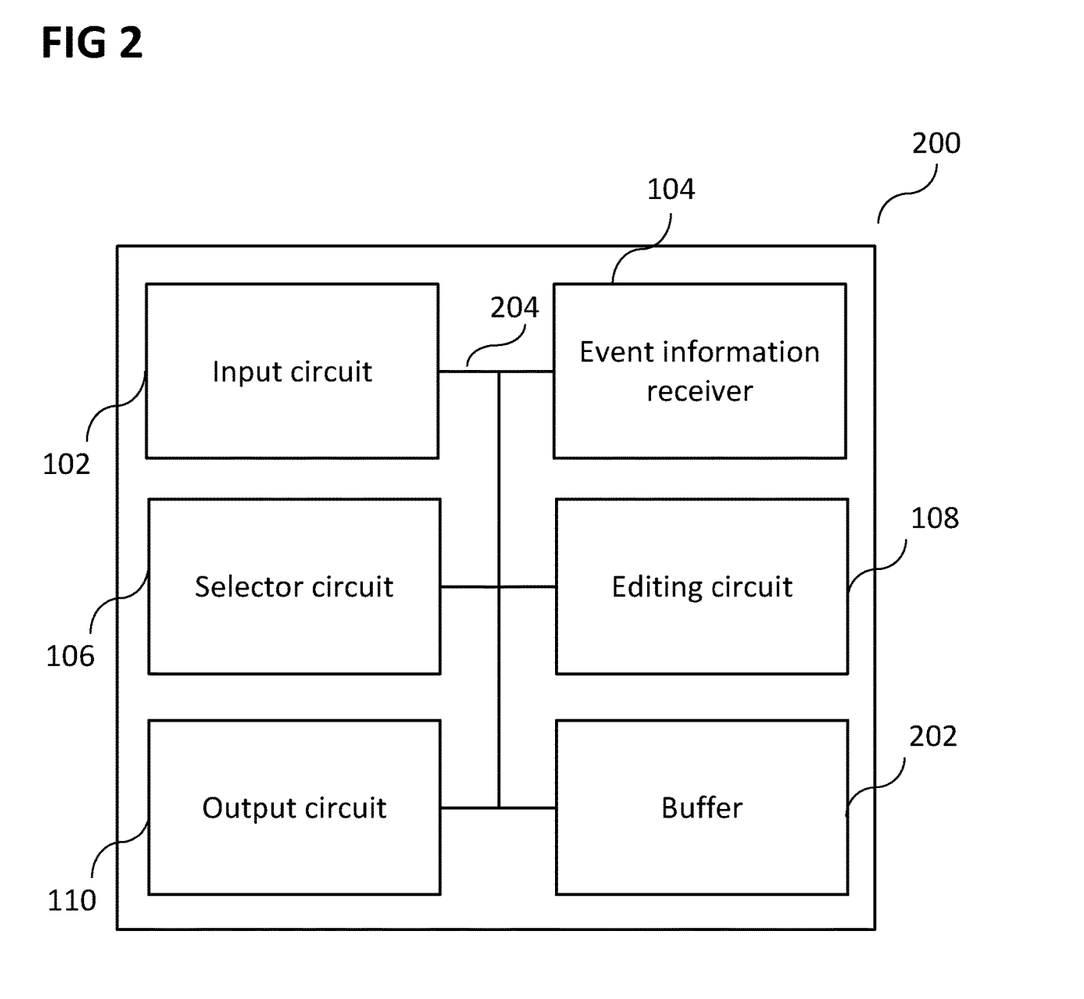
FIG. 2 shows a video server device according to various embodiments.

FIG. 2 shows a video editor server 200 according to various embodiments. The video editor server 200 may, similar to the video editor server 100 of FIG. 1, include an input circuit configured to receive information about a plurality of input video streams. The video editor server 200 may, similar to the video editor server 100 of FIG. 1, further include an event information receiver 104 configured to receive event information indicating an event related to at least one input video stream of the plurality of input video streams. The video editor server 200 may, similar to the video editor server 100 of FIG. 1, further include a selector circuit 106 configured to select an input video stream from the plurality of input video streams based on the event information. The video editor server 200 may, similar to the video editor server 100 of FIG. 1, further include an editing circuit 108 configured to generate an output video stream including (or being) the selected video stream. The video editor server 200 may, similar to the video editor server 100 of FIG. 1, further include an output circuit 110 configured to output the output video stream. The video editor server 200 may further include a buffer 202, like will be described in more detail below. The input circuit 102, the event information determination circuit 104, the selector circuit 106, the editing circuit 108, the output circuit 110, and the buffer 202 may be coupled with each other, like indicated by lines 204, for example electrically coupled, for example using a line or a cable, and/or mechanically coupled.

According to various embodiments, the buffer 202 may be configured to buffer the plurality of input video streams.

According to various embodiments, the editing circuit 106 may be configured to generate the output video stream based on the content of the buffer 202.

According to various embodiments, the editing circuit 106 may be configured to generate the output video stream based on the plurality of input video streams with increased speed after generating the output video stream based on the content of the buffer 202.

According to various embodiments, the editing circuit 106 may be configured to generate an output video stream based on at least one process selected from a list of processes consisting of: providing a split screen between at least two of the plurality of input video streams; providing a screen flip between at least two of the plurality of input video streams; providing a crossfade between at least two of the plurality of input video streams; providing picture in picture with at least two of the plurality of input video streams; providing a title overlay; providing a slow motion reaction time; providing a post production effect, providing wipes.

Figure 3:
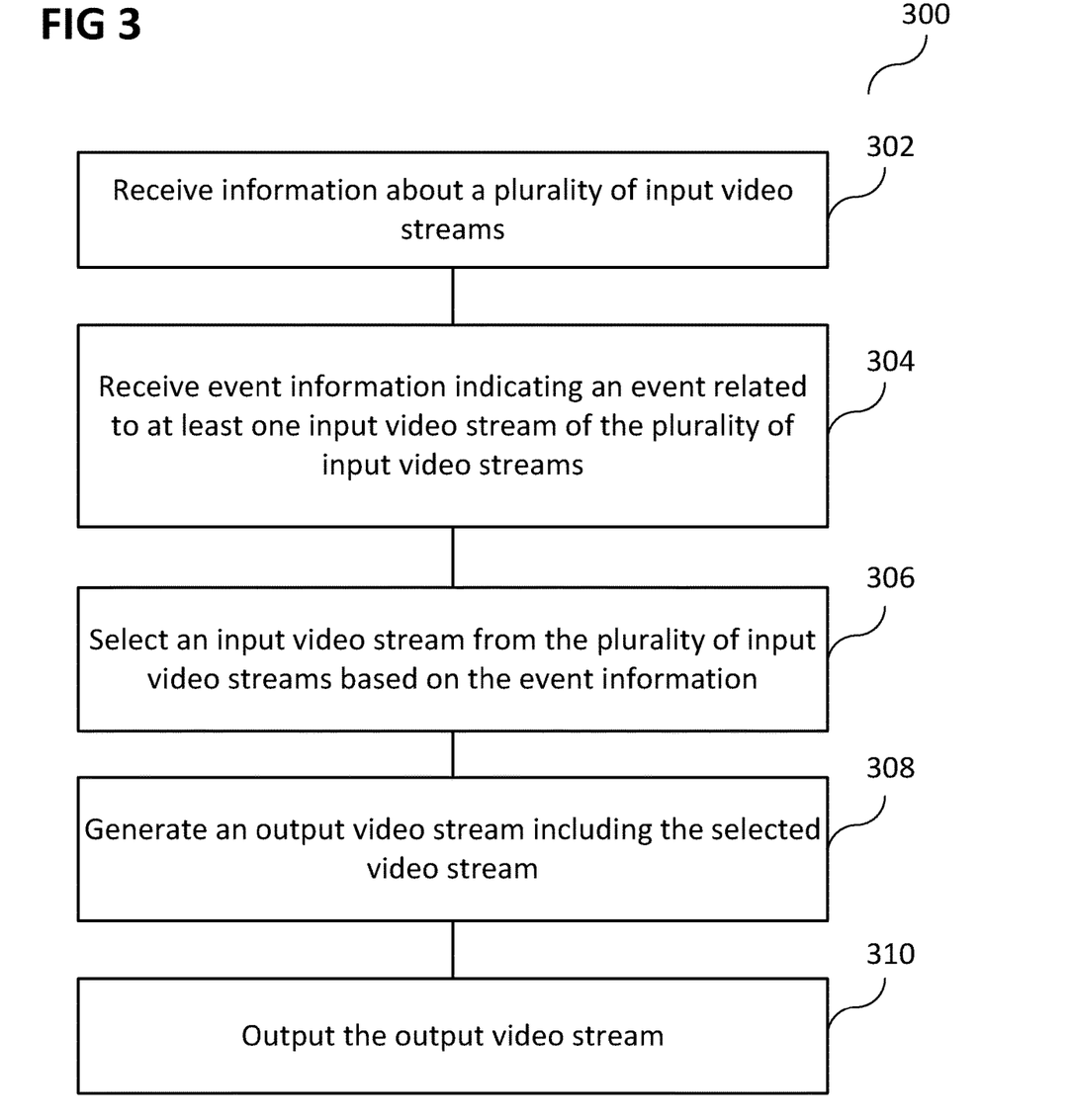
FIG. 3 shows a flow diagram illustrating a video editing method according to various embodiments.

FIG. 3 shows a flow diagram 300 illustrating a video editing method according to various embodiments. In 302, information about a plurality of input video streams may be received. In 304, event information indicating an event related to at least one input video stream of the plurality of input video streams may be received. In 306, an input video stream may be selected from the plurality of input video streams based on the event information. In 308, an output video stream including (or being) the selected video stream may be generated. In 310, the output video stream may be outputted.

According to various embodiments, the information about the plurality of input video streams may include or may be the plurality of input video streams.

According to various embodiments, the information about the plurality of input video streams may include or may be information indicating for each input video stream of the plurality of input video streams that the respective input video stream is available.

According to various embodiments, the video editing method may further include requesting the selected input video stream.

According to various embodiments, the plurality of input video streams may include a video stream showing a person playing a computer game.

According to various embodiments, the event information may include or may be or may be included in information related to the person playing the computer game.

According to various embodiments, the event information may include or may be biometric measurements taken from external biometric sensors located in wearable devices.

According to various embodiments, the event information may include or may be biometric measurements relating to the person playing the game that are transferred to a client device in real time.

According to various embodiments, the event information may include or may be or may be included in heart rate information of the person playing the computer game.

According to various embodiments, the event information may include or may be or may be included in stress information of the person playing the computer game.

According to various embodiments, the event information may include or may be or may be included in information related to words spoken by the person playing the computer game.

According to various embodiments, the plurality of input video streams may include a video stream showing a computer game.

According to various embodiments, the event information may include or may be or may be included in information related to the computer game.

According to various embodiments, the event information may include or may be or may be included in information related to a score in the computer game.

According to various embodiments, the event information may include or may be or may be included in information related to a change of a score in the computer game.

According to various embodiments, the event information may include or may be or may be included in information issued by the computer game based on a pre-determined criteria, wherein the criteria is defined by a game maker of the game.

According to various embodiments, the video editing method may further include buffering the plurality of input video streams.

According to various embodiments, the video editing method may further include generating the output video stream based on the buffered input video streams.

According to various embodiments, the video editing method may further include generating the output video stream based on the plurality of input video streams with increased speed after generating the output video stream based on buffered input video streams.

According to various embodiments, the video editing method may further include generating an output video stream based on at least one process selected from a list of processes consisting of: selecting one input video stream of the plurality of input video streams as output video stream; providing a split screen between at least two of the plurality of input video streams; providing a screen flip between at least two of the plurality of input video streams; providing a crossfade between at least two of the plurality of input video streams; providing picture in picture with at least two of the plurality of input video streams; providing a title overlay; providing a slow motion reaction time; providing a post production effect, providing wipes.

Figure 4:
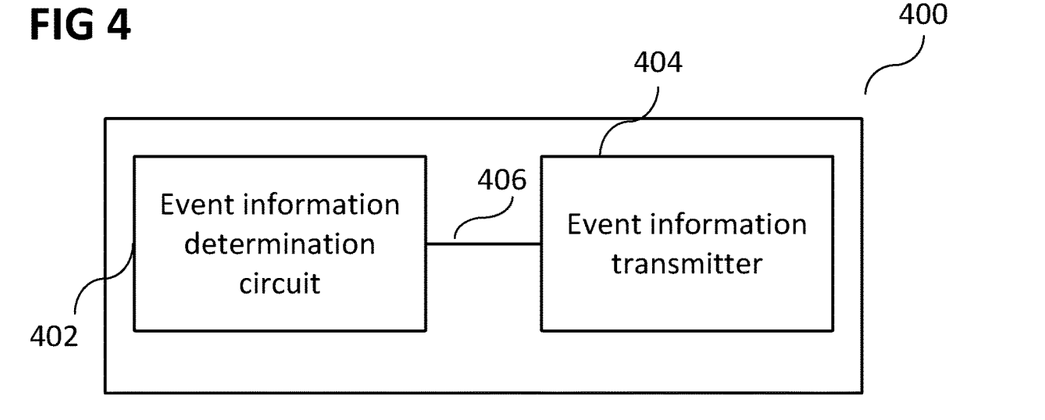
FIG. 4 shows a client device according to various embodiments.

FIG. 4 shows a client device 400 according to various embodiments. The client device 400 may include an event information determination circuit 402 configured to determine event information indicating an event related to an input video stream. The client device 400 may further include an event information transmitter 404 configured to transmit the determined event information to a video editor server (for example like described with reference to FIG. 1 or FIG. 2 above) for determination whether the input video stream is to be selected for an output video stream. The event information determination circuit 402 and the event information transmitter 404 may be coupled with each other, like indicated by line 406, for example electrically coupled, for example using a line or a cable, and/or mechanically coupled.

In other words, according to various embodiments, the client device may determine an event information (for example event information like described above with reference to the video editor server), and may transmit this event information to the video editor server for determination whether a video stream related to the client device should be selected for an output video stream or not.

Figure 5:
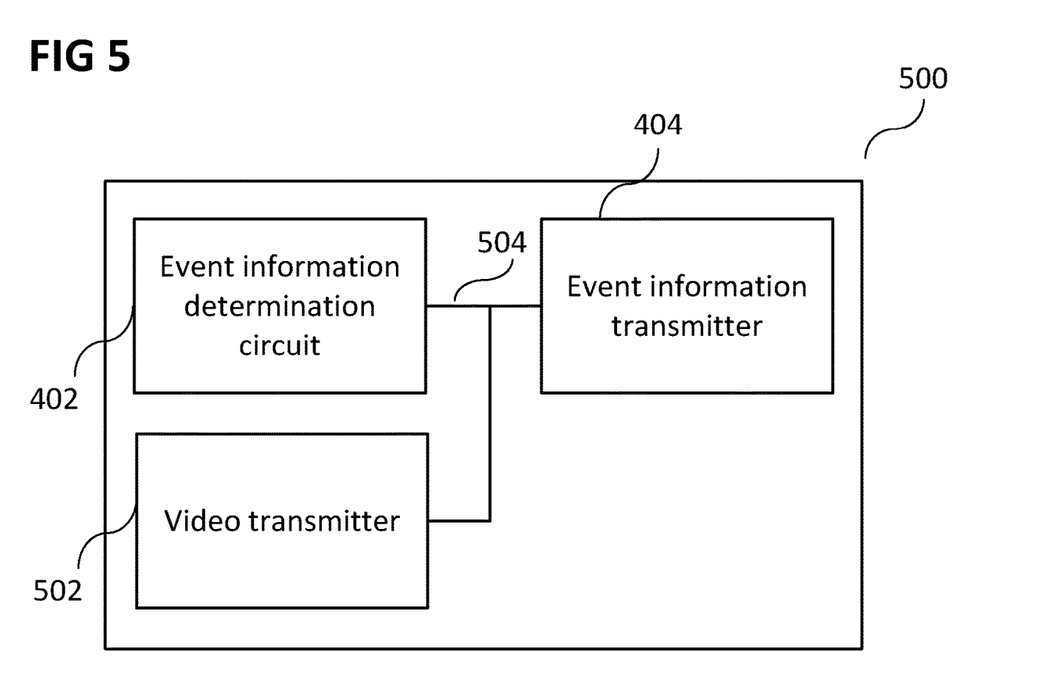
FIG. 5 shows a client device according to various embodiments.

FIG. 5 shows a client device 500 according to various embodiments. The client device 500 may, similar to the client device 400 of FIG. 4, include an event information determination circuit 402 configured to determine event information indicating an event related to an input video stream. The client device 500 may, similar to the client device 400 of FIG. 4, further include an event information transmitter 404 configured to transmit the determined event information to a video editor server for determination whether the input video stream is to be selected for an output video stream. The client device 500 may further include a video transmitter 502, like will be described in more detail below. The event information determination circuit 402, the event information transmitter 404, and the video transmitter 502 may be coupled with each other, like indicated by lines 504, for example electrically coupled, for example using a line or a cable, and/or mechanically coupled.

According to various embodiments, the video transmitter 502 may be configured to transmit the input video stream to the video editor server.

According to various embodiments, the video transmitter 502 may be configured to transmit the input video stream to the video editor server upon request from the video editor server.

Figure 6:
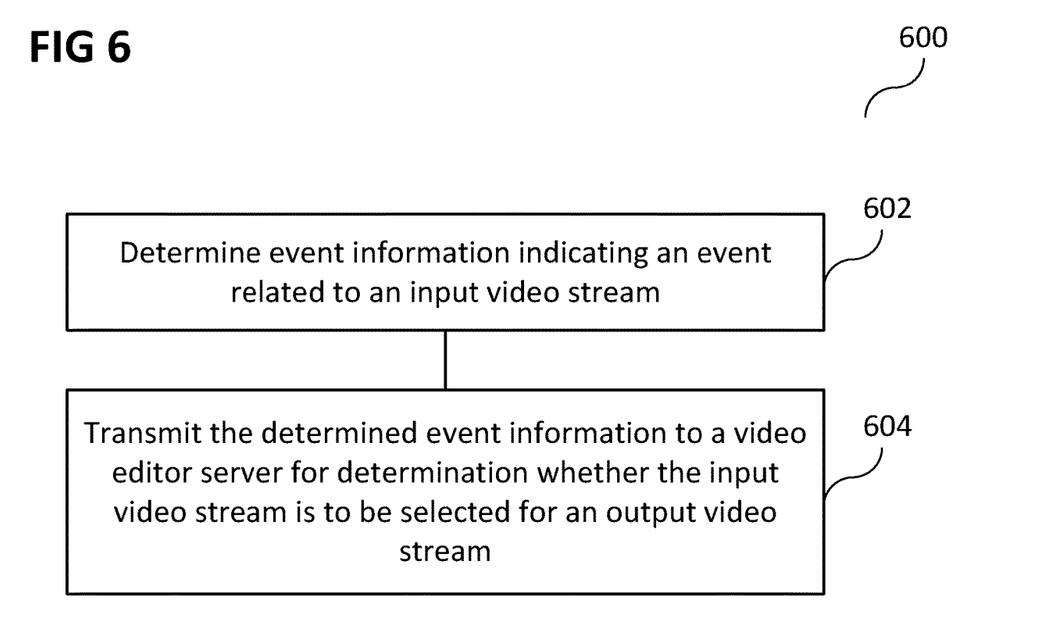
FIG. 6 shows a flow diagram illustrating a method for controlling a client device according to various embodiments.

FIG. 6 shows a flow diagram 600 illustrating a method for controlling a client device according to various embodiments. In 602, an event information indicating an event related to an input video stream may be determined. In 604, the determined event information may be transmitted to a video editor server for determination whether the input video stream is to be selected for an output video stream.

According to various embodiments, the method may further include transmitting the input video stream to the video editor server.

According to various embodiments, the input video stream may be transmitted to the video editor server upon request from the video editor server.

According to various embodiments, an automated video editing system may be provided so that when gamers are streaming their face, voice and game video, the automated video editing system allows viewers to view the most pertinent parts of the video stream without human interaction. When in use with at least two players playing a networked connected video game, the software or application according to various embodiments allows each of the players to have at least a video camera or a web camera focused on the player's face and a recording and streaming functions that streams the two feeds to a video game platform. Most gaming streams that are viewable on video game platforms have a combination of video game stream and webcam feed focused on player. The most pertinent parts of the video stream are automatically selected by the application according to various embodiments using configurable event information which are then compiled and streamed real time to the video gaming platform. Although the embodiments are for use on video gaming platforms, it will be understood that other forms of video platforms that provide live streaming videos may be used. The streamed video can be saved and uploaded to other social media websites.

According to various embodiments, a pertinent part (in other words: event information) may include (or may be determined by) body sensors measuring stress like HR (hear rate) monitors and stress meters.

According to various embodiments, a pertinent part may include when a streamer screams or yells.

According to various embodiments, a pertinent part may include when a streamer (in other words: a computer game character controlled by a streaming person) dies, kills or does something interesting in the game.

According to various embodiments, a pertinent part may include a significant score increase.

According to various embodiments, in competitive games, a pertinent part may include when one player defeats another player.

According to various embodiments, for example using an API (application programming interface), game makers may trigger events based on in game criteria.

According to various embodiments, the device (for example system) may be augmented such that it runs behind real time when there are multiple events that must be shown at once (i.e. showing two different gamer's facing for the same event).

According to various embodiments, a pre-determined period of time (for example 7 seconds) of video from all video streams may be buffered to provide the ability to rewind at key moments.

According to various embodiments, when a key moment happens, the real time stream may be paused and buffered to allow for replay.

According to various embodiments, after a replay, the device may resume the buffered feed slightly increasing the video playback (in other words: increasing the video playback speed) until real-time sync is reached.

According to various embodiments, automated editing may include split screen, screen flips, crossfades, picture in picture, title overlays (including game data such as scores), slow motion reaction time, post production effects (for example image stabilization, zooming in and out, color correction, brightness and contrast correction), and/or wipes.

In the following, a narrative example according to various embodiments will be described.

Two players, for example Mark and Jeff, may be playing a computer game, for example Call of Duty. They both may have video cameras pointed at them and are streaming their games to an online streaming service.

A third person, for example Mila, may be watching Mark and Jeff play Call of Duty against each other through an online video viewer.

A device (or a method) according to various embodiments, for example an automated software, may gather data about the game play and may begin to make decisions about what to show on the video feed based on a set of criteria. The video may be slightly delayed, for example by a few seconds, to allow time for the software to react to events. According to various embodiments, there may be the following components to the infrastructure: a central server that receives multiple video feeds from various networked-connected external sources or IP addresses, and an application that resides on the user's electronic device. The server may communicate with one or more remotely located users over the network. The network may be for example, Ethernet, a wireless network, or an Internet connection. The server may be a single device or a plurality of devices connected in parallel or a dedicated machine with a known address. The server may form part of a leased computing and storage resource in the 'cloud'. The server may be a video-editing application server. The application may provide the user interface for the user to configure functions or features (or event information) that may affect the final automated compiled live video feed. The application may also include retrieval of event information from external sensors from remote devices such as sound and biometric measurements. Alternatively, no configuration may be required. The central server may execute the video editing process based on the user configured event information. The central server may also receive event information, including those from external sensors, from the application in order to automatically compile the live video feed.

The video feed may cut back and forth at regular intervals while there is minimal action. Mark and Jeff may move into position. The clock may count down and the game may begin. Mark may comment that he is going to win. The device or the method according to various embodiments may overlay Mark's camera feed picture in picture as he talks.

Mark may lines up a nice shot and may take Jeff out, scoring the first point.

At this moment, the device or method according to various embodiments (for example the video feed device or software) may cut to Mark's view, rewinding a few seconds to show the in game event. Since Jeff yelled when he lost the encounter, the device or method according to various embodiments may then insert an overlay shot of the camera pointing at Jeff to gather his reaction. Mark may be pleased with the event and may do a victory dance. The device or software according to various embodiments may detect the increased movement and may quickly cut back to shows a split screen that includes Mark's reaction to the victory. As action settles, the video feed may return to the game play footage following Mark since he is now in the lead.

Mila, watching the single video feed, may be able to see all the action of the game event without either Mark or Jeff editing the footage.

The following examples pertain to further embodiments.

Example 1 is a video editor server comprising: an input circuit configured to receive information about a plurality of input video streams; an event information receiver configured to receive event information indicating an event related to at least one input video stream of the plurality of input video streams; a selector circuit configured to select an input video stream from the plurality of input video streams based on the event information; an editing circuit configured to generate an output video stream comprising the selected video stream; and an output circuit configured to output the output video stream.

In example 2, the subject-matter of example 1 can optionally include that the information about the plurality of input video streams comprises the plurality of input video streams.

In example 3, the subject-matter of any one of examples 1 to 2 can optionally include that the information about the plurality of input video streams comprises information indicating for each input video stream of the plurality of input video streams that the respective input video stream is available.

In example 4, the subject-matter of any one of examples 1 to 3 can optionally include that the selector circuit is further configured to request the selected input video stream.

In example 5, the subject-matter of any one of examples 1 to 4 can optionally include that the plurality of input video streams comprises a video stream showing a person playing a computer game.

In example 6, the subject-matter of example 5 can optionally include that the event information comprises information related to the person playing the computer game.

In example 7, the subject-matter of any one of examples 5 to 6 can optionally include that the event information comprises biometric measurements taken from external biometric sensors located in wearable devices.

In example 8, the subject-matter of any one of examples 5 to 7 can optionally include that the event information comprises biometric measurements relating to the person playing the game that are transferred to a client device in real time.

In example 9, the subject-matter of any one of examples 5 to 8 can optionally include that the event information comprises heart rate information of the person playing the computer game.

In example 10, the subject-matter of any one of examples 5 to 9 can optionally include that the event information comprises stress information of the person playing the computer game.

In example 11, the subject-matter of any one of examples 5 to 10 can optionally include that the event information comprises information related to words spoken by the person playing the computer game.

In example 12, the subject-matter of any one of examples 1 to 11 can optionally include that the plurality of input video streams comprises a video stream showing a computer game.

In example 13, the subject-matter of example 12 can optionally include that the event information comprises information related to the computer game.

In example 14, the subject-matter of example 13 can optionally include that the event information comprises information related to a score in the computer game.

In example 15, the subject-matter of example 14 can optionally include that the event information comprises information related to a change of a score in the computer game.

In example 16, the subject-matter of any one of examples 13 to 15 can optionally include that the event information comprises information issued by the computer game based on a pre-determined criteria, wherein the criteria is defined by a game maker of the game.

In example 17, the subject-matter of any one of examples 1 to 16 can optionally include a buffer configured to buffer the plurality of input video streams.

In example 18, the subject-matter of example 17 can optionally include that the editing circuit is configured to generate the output video stream based on the content of the buffer.

In example 19, the subject-matter of example 18 can optionally include that the editing circuit is configured to generate the output video stream based on the plurality of input video streams with increased speed after generating the output video stream based on the content of the buffer.

In example 20, the subject-matter of any one of examples 1 to 19 can optionally include that the editing circuit is configured to generate an output video stream based on at least one process selected from a list of processes consisting of: providing a split screen between at least two of the plurality of input video streams; providing a screen flip between at least two of the plurality of input video streams; providing a crossfade between at least two of the plurality of input video streams; providing picture in picture with at least two of the plurality of input video streams; providing a title overlay; providing a slow motion reaction time; providing a post production effect, providing wipes.

Example 21 is a video editing method comprising: receiving information about a plurality of input video streams; receiving event information indicating an event related to at least one input video stream of the plurality of input video streams; selecting an input video stream from the plurality of input video streams based on the event information; generating an output video stream comprising the selected video stream; and outputting the output video stream.

In example 22, the subject-matter of example 21 can optionally include that the information about the plurality of input video streams comprises the plurality of input video streams.

In example 23, the subject-matter of any one of examples 21 to 22 can optionally include that the information about the plurality of input video streams comprises information indicating for each input video stream of the plurality of input video streams that the respective input video stream is available.

In example 24, the subject-matter of any one of examples 21 to 23 can optionally include requesting the selected input video stream.

In example 25, the subject-matter of any one of examples 21 to 24 can optionally include that the plurality of input video streams comprises a video stream showing a person playing a computer game.

In example 26, the subject-matter of example 25 can optionally include that the event information comprises information related to the person playing the computer game.

In example 27, the subject-matter of any one of examples 25 to 26 can optionally include that the event information comprises biometric measurements taken from external biometric sensors located in wearable devices.

In example 28, the subject-matter of any one of examples 25 to 27 can optionally include that the event information comprises biometric measurements relating to the person playing the game that are transferred to a client device in real time.

In example 29, the subject-matter of any one of examples 25 to 28 can optionally include that the event information comprises heart rate information of the person playing the computer game.

In example 30, the subject-matter of any one of examples 25 to 29 can optionally include that the event information comprises stress information of the person playing the computer game.

In example 31, the subject-matter of any one of examples 25 to 30 can optionally include that the event information comprises information related to words spoken by the person playing the computer game.

In example 32, the subject-matter of any one of examples 21 to 31 can optionally include that the plurality of input video streams comprises a video stream showing a computer game.

In example 33, the subject-matter of example 32 can optionally include that the event information comprises information related to the computer game.

In example 34, the subject-matter of example 33 can optionally include that the event information comprises information related to a score in the computer game.

In example 35, the subject-matter of example 34 can optionally include that the event information comprises information related to a change of a score in the computer game.

In example 36, the subject-matter of any one of examples 33 to 35 can optionally include that the event information comprises information issued by the computer game based on a pre-determined criteria, wherein the criteria is defined by a game maker of the game.

In example 37, the subject-matter of any one of examples 21 to 36 can optionally include buffering the plurality of input video streams.

In example 38, the subject-matter of example 37 can optionally include generating the output video stream based on the buffered input video streams.

In example 39, the subject-matter of example 38 can optionally include generating the output video stream based on the plurality of input video streams with increased speed after generating the output video stream based on buffered input video streams.

In example 40, the subject-matter of any one of examples 21 to 39 can optionally include generating an output video stream based on at least one process selected from a list of processes consisting of: providing a split screen between at least two of the plurality of input video streams; providing a screen flip between at least two of the plurality of input video streams; providing a crossfade between at least two of the plurality of input video streams; providing picture in picture with at least two of the plurality of input video streams; providing a title overlay; providing a slow motion reaction time; providing a post production effect, providing wipes.

Example 41 is a client device comprising: an event information determination circuit configured to determine event information indicating an event related to an input video stream; and an event information transmitter configured to transmit the determined event information to a video editor server for determination whether the input video stream is to be selected for an output video stream.

In example 42, the subject-matter of example 41 can optionally include a video transmitter configured to transmit the input video stream to the video editor server.

In example 43, the subject-matter of example 42 can optionally include that the video transmitter is configured to transmit the input video stream to the video editor server upon request from the video editor server.

Example 44 is a method for controlling a client device, the method comprising: determining event information indicating an event related to an input video stream; and transmitting the determined event information to a video editor server for determination whether the input video stream is to be selected for an output video stream.

In example 45, the subject-matter of example 44 can optionally include transmitting the input video stream to the video editor server.

In example 46, the subject-matter of example 45 can optionally include that the input video stream is transmitted to the video editor server upon request from the video editor server.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A video editor system comprising:
a video editor server and one or more client devices, wherein the video editor server comprises:
a memory; and
at least one processor coupled to the memory and configured to:
receive information about a plurality of input video streams, wherein the information comprises event information related to at least one input video stream of the plurality of input video streams; and the plurality of input video streams comprises a video stream showing a respective person playing an action computer game;
receive a real time biometric measurement comprising information related to heart rate information and stress information of the respective person playing the action computer game taken from a biometric sensor coupled to the respective person;
select the at least one input video stream, wherein the input video stream may be selected from the plurality of input video streams based on the event information, wherein the event information comprises the biometric measurement and information related to the action computer game;
generate an output video stream comprising the selected input video stream; and
output the output video stream in near real time.

2. The video editor system of claim 1, wherein the at least one processor is further configured to request the selected video stream from a buffer to generate the output video stream.

3. The video editor system of claim 2, wherein the at least one processor is further configured to:
buffer the plurality of input video streams; and
rewind the output video stream in time to replay a clip of the selected video stream based on the plurality of buffered input video streams, wherein, after the replay of the clip of the selected video stream, and generate the output video stream with increased playback speed in comparison with a default playback speed based on the plurality of buffered input video streams until real-time sync is reached.

4. The video editor system of claim 1, wherein the plurality of input video streams further comprises a video stream showing the action computer game.

5. The video editor system of claim 4, wherein the biometric sensor is located in a wearable device; and
wherein the biometric measurement is transferred to the client device in real time.

6. The video editor system of claim 4, wherein the at least one processor is further configured to:
receive action computer game information comprising at least one of a score in the action computer game, a change of the score in the action computer game or information issued by the action computer game based on a pre-determined criteria, wherein the pre-determined criteria is defined by a game maker of the action computer game;
select the video stream showing the action computer game as a further input video stream based on the action computer game information;
generate the output video stream further comprising the selected further video stream.

7. The video editor system of claim 4, wherein the at least one processor is further configured to:
receive sound measurement, taken from a sound sensor, comprising at least of information related to words spoken by the person playing the action computer game or an increase in volume of words spoken by the person playing the action computer game;
select a further video stream from the plurality of input video streams as a further input video stream based on the sound measurement taken from the sound sensor;
generate the output video stream further comprising the selected further video stream.

8. The video editor system of claim 1, wherein the at least one processor is further configured to generate the output video stream based on at least one process selected from a list of processes consisting of: providing a split screen between at least two of the plurality of input video streams; providing a screen flip between at least two of the plurality of input video streams; providing a crossfade between at least two of the plurality of input video streams; providing picture in picture with at least two of the plurality of input video streams; providing a title overlay; providing a slow motion reaction time; providing a post production effect, providing wipes.

9. A video editing method comprising:
receiving information about a plurality of input video streams using a video editor server coupled to one or more client devices, wherein the information comprises event information related to at least one input video stream of the plurality of input video streams; and
the plurality of input video streams comprises a video stream showing a respective person playing an action computer game;
receiving a real time biometric measurement comprising information related to heart rate information and stress information of the person playing the action computer game taken from a biometric sensor coupled to the respective person;
selecting the at least one input video stream, wherein the input video stream may be selected from the plurality of input video streams based on the event information, wherein the event information comprises the biometric measurement and information related to the action computer game;
generating an output video stream comprising the selected input video stream; and
outputting the output video stream in near real time.

10. The video editing method of claim 9,
wherein the at least one input video stream shows the action computer game.

11. The video editing method of claim 10, further comprising:
receiving sound measurement, taken from a sound sensor, comprising at least of information related to words spoken by the respective person playing the action computer game or an increase in volume of words spoken by the respective person playing the action computer game;
selecting a further video stream from the plurality of input video streams as a further input video stream based on the sound measurement taken from the sound sensor;
generating the output video stream further comprising the selected further video stream.

12. The video editing method of claim 10,
wherein the biometric measurement is transferred to the client device in real time.

13. The video editing method of claim 9,
wherein the biometric measurement is taken from the biometric sensor located in a wearable device.

14. The video editing method of claim 9, further comprising requesting the selected video stream from a buffer to generate the output video stream.

15. The video editing method of claim 14, further comprising:
buffering the plurality of input video streams;
rewinding the output video stream in time to replay a clip of the selected video stream based on the plurality of buffered input video streams, wherein, after the replay of the clip of the selected video stream; and
the at least one processor is further configured to generate the output video stream with increased playback speed in comparison with a default playback speed based on the plurality of buffered input video streams until real-time sync is reached.

16. The video editing method of claim 9, further comprising generating the output video stream based on at least one process selected from a list of processes consisting of: providing a split screen between at least two of the plurality of input video streams; providing a screen flip between at least two of the plurality of input video streams; providing a crossfade between at least two of the plurality of input video streams; providing picture in picture with at least two of the plurality of input video streams; providing a title overlay; providing a slow motion reaction time; providing a post production effect, and providing wipes.

17. The video editor method of claim 10, further comprising:
receiving action computer game information comprising a score in the action computer game, a change of the score in the computer game or information issued by the action computer game based on a pre-determined criteria, wherein the pre-determined criteria is defined by a game maker of the action computer game;
selecting the video stream showing the action computer game as a further input video stream based on the action computer game information; and
generating the output video stream further comprising the selected further video stream.

* * * * *